United States Patent
Qi et al.

(10) Patent No.: US 11,215,697 B2
(45) Date of Patent: Jan. 4, 2022

(54) AMPLITUDE-PHASE CORRECTION METHOD AND SYSTEM FOR MICROWAVE IMAGING SYSTEM

(71) Applicants: Shenzhen Institute of Terahertz Technology and Innovation, Guangdong (CN); Shenzhen Victooth Terahertz Technology Co., Ltd., Guangdong (CN)

(72) Inventors: Chunchao Qi, Guangdong (CN); Guangsheng Wu, Guangdong (CN); Shukai Zhao, Guangdong (CN); Qian Xiao, Guangdong (CN); Aixian Wang, Guangdong (CN)

(73) Assignees: Shenzhen Institute of Terahertz Technology and Innovation, Guangdong (CN); Shenzhen Victooth Terahertz Technology Co., Ltd., Guangdong (CN)

( * ) Notice: Subject to any disclaimer, the term of this patent is extended or adjusted under 35 U.S.C. 154(b) by 162 days.

(21) Appl. No.: 16/608,173

(22) PCT Filed: Sep. 7, 2017

(86) PCT No.: PCT/CN2017/100910
§ 371 (c)(1),
(2) Date: Oct. 24, 2019

(87) PCT Pub. No.: WO2018/196254
PCT Pub. Date: Nov. 1, 2018

(65) Prior Publication Data
US 2020/0142030 A1    May 7, 2020

(30) Foreign Application Priority Data
Apr. 28, 2017   (CN) .......................... 201710296524.3

(51) Int. Cl.
*G01S 7/41*     (2006.01)
*G01S 13/89*    (2006.01)
(Continued)

(52) U.S. Cl.
CPC ............ *G01S 7/418* (2013.01); *G01S 7/4004* (2013.01); *G01S 13/887* (2013.01); *G01S 13/89* (2013.01)

(58) Field of Classification Search
None
See application file for complete search history.

(56) References Cited

U.S. PATENT DOCUMENTS 6,027,447 A      2/2000 Li
6,597,304 B2 *   7/2003 Fienup .................... G01S 13/89
                                                           342/159
(Continued)

FOREIGN PATENT DOCUMENTS

CN    102565796 A    7/2012
CN    103018739 A    4/2013
(Continued)

*Primary Examiner* — Bernarr E Gregory
(74) *Attorney, Agent, or Firm* — Young Basile Hanlon & MacFarlane, P.C.

(57) ABSTRACT

An amplitude-phase correction method and system for a microwave imaging system are provided. The method comprises: carrying out data processing, in a range direction, on an echo signal reflected from a target object and acquired by a linear array antenna according to a first pre-set algorithm to obtain a compressed signal in the range direction; extracting a range value corresponding to the maximum amplitude, in the range direction, of the compressed signal in the range direction; carrying out time delay compensation on the echo signal according to the range value to obtain a time-delay-compensated signal; carrying out data processing on the time-delay-compensated signal according to a second pre-set algorithm to obtain an amplitude-phase signal; and (Continued)

carrying out amplitude-phase correction on the echo signal according to the time-delay-compensated signal and the amplitude-phase signal to obtain a corrected echo signal.

10 Claims, 7 Drawing Sheets

(51) Int. Cl.
    *G01S 7/40*         (2006.01)
    *G01S 13/88*       (2006.01)
    *G01S 13/00*       (2006.01)

(56) References Cited

U.S. PATENT DOCUMENTS

| | | | |
|---|---|---|---|
| 10,571,550 B2 * | 2/2020 | Theurer | G01S 13/88 |
| 2010/0149023 A1 * | 6/2010 | Cho | G01S 7/40 |
| | | | 342/25 A |
| 2012/0218140 A1 * | 8/2012 | Bergeron | G01S 7/4004 |
| | | | 342/25 A |

FOREIGN PATENT DOCUMENTS

| | | | | |
|---|---|---|---|---|
| CN | 102890271 B | * | 11/2013 | G01S 7/40 |
| CN | 103941242 A | | 7/2014 | |
| CN | 104020456 A | * | 9/2014 | G01S 7/40 |
| CN | 105044693 A | | 11/2015 | |
| CN | 107132510 A | | 9/2017 | |
| DE | 4240225 A1 | * | 6/1994 | G01S 7/40 |
| JP | 2006284527 A | | 10/2006 | |

* cited by examiner

AMPLITUDE-PHASE CORRECTION METHOD AND SYSTEM FOR MICROWAVE IMAGING SYSTEM

CROSS-REFERENCE TO RELATED APPLICATION(S)

This application is a 371 application of International Application No. PCT/CN2017/100910, filed on Sep. 7, 2017, which claims priority to Chinese Patent Application No. 201710296524.3, filed on Apr. 28, 2017, the entire disclosure of both of which is hereby incorporated by reference in their entireties.

FIELD

The disclosure belongs to the technical field of microwave imaging, and particularly relates to an amplitude-phase correction method and system for a microwave imaging system.

BACKGROUND

The microwave imaging technology carries out scan imaging on objects by means of actively-transmitted electromagnetic microwaves which can penetrate through the surfaces of objects to detect metallic or non-metallic prohibited articles hidden in the objects. The microwave imaging technology has the characteristics of small radiation dosage, belonging to non-ionizing radiation and the like, thereby being widely applied to microwave imaging system such as safety inspection instrument, to perform human safety inspection tasks. According to the existing common microwave imaging technology, echo signals at the acquisition positions of all equivalent antennas need to be acquired by means of a linear array antenna to form an echo signal set which is then sent to a signal processing unit of a safety inspection system to be processed in a unified manner for imaging, so that the image of a target object is obtained. In actual application, due to the differences between directional patterns, microwave energy and initial phases of channels of the linear array antenna, amplitude-phase correction needs to be carried out on the echo signals acquired via the channels of the linear array antenna to correlate the echo signals of the channels so as to realize normal imaging. However, due to the fact that existing common amplitude-phase correction methods generally carry out amplitude-phase correction by means of direct waves in the echo signals acquired via the channels of the linear array antenna, only echo signals having an amplitude near 0° can be corrected, compensation for the difference between the directional patterns of the channels cannot be realized and the correction effect is unsatisfactory when the direct waves are weak.

SUMMARY

The disclosure provides an amplitude-phase correction method and system for a microwave imaging system to solve the problems that since the existing common amplitude-phase correction methods carry out amplitude-phase correction by means of direct waves in echo signals acquired via channels of a linear array antenna, only echo signals having an amplitude near 0° can be corrected, compensation for the difference between directional patterns of the channels cannot be realized and the correction effect is unsatisfactory when the direct waves are weak.

The disclosure provides an amplitude-phase correction method for a microwave imaging system. The amplitude-phase correction method comprises:

Carrying out data processing, in a range direction, on an echo signal reflected from a target object and acquired by a linear array antenna according to a first pre-set algorithm to obtain a compressed signal in the range direction;

Extracting a range value corresponding to the maximum amplitude, in the range direction, of the compressed signal in the range direction;

Carrying out time delay compensation on the echo signal according to the range value to obtain a time-delay-compensated signal;

Carrying out data processing on the time-delay-compensated signal according to a second pre-set algorithm to obtain an amplitude-phase signal; and Carrying out amplitude-phase correction on the echo signal according to the time-delay-compensated signal and the amplitude-phase signal to obtain a corrected echo signal.

The disclosure further provides an amplitude-phase correction system for a microwave imaging system. The amplitude-phase correction system comprises:

A range-direction compression device, configured to carry out data processing, in a range direction, on an echo signal reflected from a target object and acquired by a linear array antenna according to a first pre-set algorithm to obtain a compressed signal in the range direction;

A range value extraction device, configured to extract a range value corresponding to the maximum amplitude, in the range direction, of the compressed signal in the range direction;

A time delay compensation device, configured to carry out time delay compensation on the echo signal according to the range value to obtain a time-delay-compensated signal;

An amplitude-phase signal processing device, configured to carry out data processing on the time-delay-compensated signal according to a second pre-set algorithm to obtain an amplitude-phase signal; and An echo correction device, configured to carry out amplitude-phase correction on the echo signal according to the time-delay-compensated signal and the amplitude-phase signal to obtain a corrected echo signal.

By means of directly carrying out amplitude-phase correction on an echo signal, acquired by a linear array antenna, from a target object, the method and system do not depend on direct waves, and the difference between directional patterns of channels of a linear array antenna can be better compensated for.

BRIEF DESCRIPTION OF DRAWINGS

In order to explain the technical solutions of the embodiments of the disclosure more clearly, a brief description of the accompanying drawings required for illustrating the embodiments is given below. Clearly, the accompanying drawings in the following description are provided for illustrating certain embodiments only, and those ordinarily skilled in the art can obtain other drawings based on the following ones without creative work.

DETAILED DESCRIPTION

In order to provide a better understanding of the technical solutions of the disclosure for those skilled in the art, the technical solutions of the embodiments are clearly described below with reference to the accompanying drawings. Clearly, the embodiments in the following description are illustrative ones only and are not all possible ones of the disclosure. All other embodiments obtained by those ordinarily skilled in the art based on these illustrative ones without creative work should also fall within the protection scope of the disclosure.

The term "comprise" involved in the description, claims and accompanying drawings, and any transformations of this term refer to non-exclusive inclusion. For instance, a process or method comprising a series of steps, or a system, product or device comprising a series of devices is not limited to the steps or devices listed, and may also include steps or devices which are not listed, or include other intrinsic steps of the process or method, or other intrinsic devices of the system, product or device.

All the embodiments of the disclosure are implemented on the basis of a microwave imaging system which comprises a linear array antenna formed by a pre-set number of antennas which are linearly arrayed in the horizontal or vertical direction, a signal transceiver, a mechanical rotating device, and a signal processing unit.

In specific applications, a graphics processing unit (GPU) is adopted to serve as the signal processing unit.

The mechanical rotating device controls the linear array antenna to rotate around a pre-set rotation axis, the signal transceiver transmits a signal and then receives an echo signal reflected from a target object to be imaged in the rotating process of the array antenna, and then the echo signal is sent by the signal transceiver to the signal processing unit to be processed into an imaging result, so that scan imaging of all sampling points on the object to be imaged is realized. The microwave imaging system can be divided into a planar scanning system and a cylindrical scanning system in terms of the shape of a scan surface formed by equivalent phase positions in the rotating process of the linear array antenna.

Figure 1:
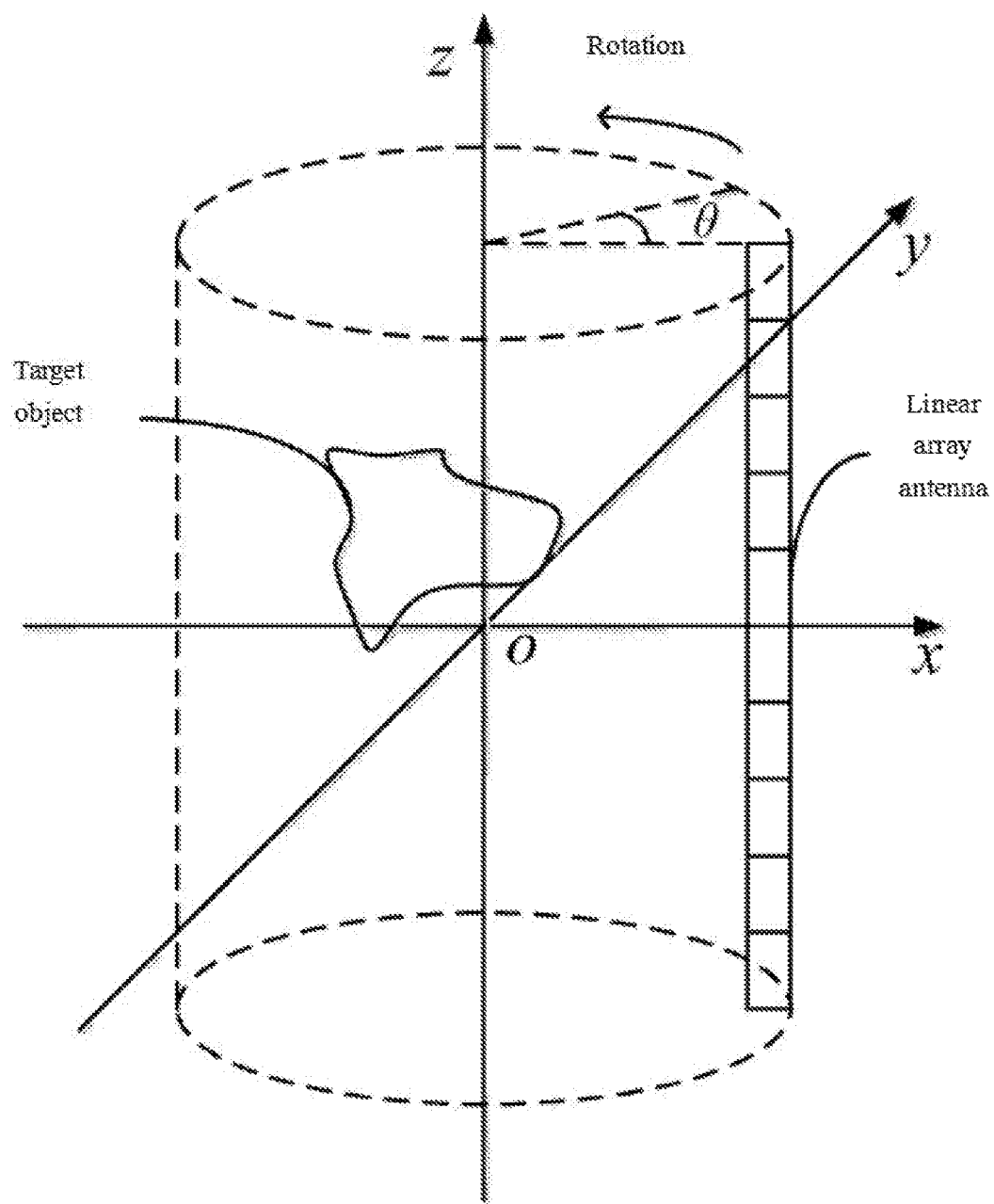
FIG. 1 is a schematic diagram of a cylindrical scanning system in a cartesian coordinate system in one embodiment of the disclosure.

The operating principle of the cylindrical scanning system is emphatically introduced below:

As shown in FIG. 1, an X axis is set to be parallel to the horizontal plane, an axis which is orthogonal to the X axis and is located on the same horizontal plane as the X axis is set as a Y axis, and a pre-set rotation axis is set as a Z axis, wherein the X axis, the Y axis and the Z axis are made to intersect at point O on the Z axis; and a cartesian coordinate system O-XYZ including the X axis, the Y axis and the Z axis is established with point O being as the origin.

A plurality of antennas are arrayed in a direction parallel to the Z axis to form a vertical linear array antenna which rotates around the Z axis to acquire an echo signal reflected from the target object, and phase centers, in the array direction, of the antennas in the vertical linear array antenna are distributed at equal intervals, which means that the distances between the phase centers, in the array direction, of the adjacent antennas are equal.

In one embodiment, the target object particularly is a metal object which has high reflectivity to microwave signals and low absorptivity or transmissivity to the microwave signals, such as a metal plate, or a metal block.

Figure 2:
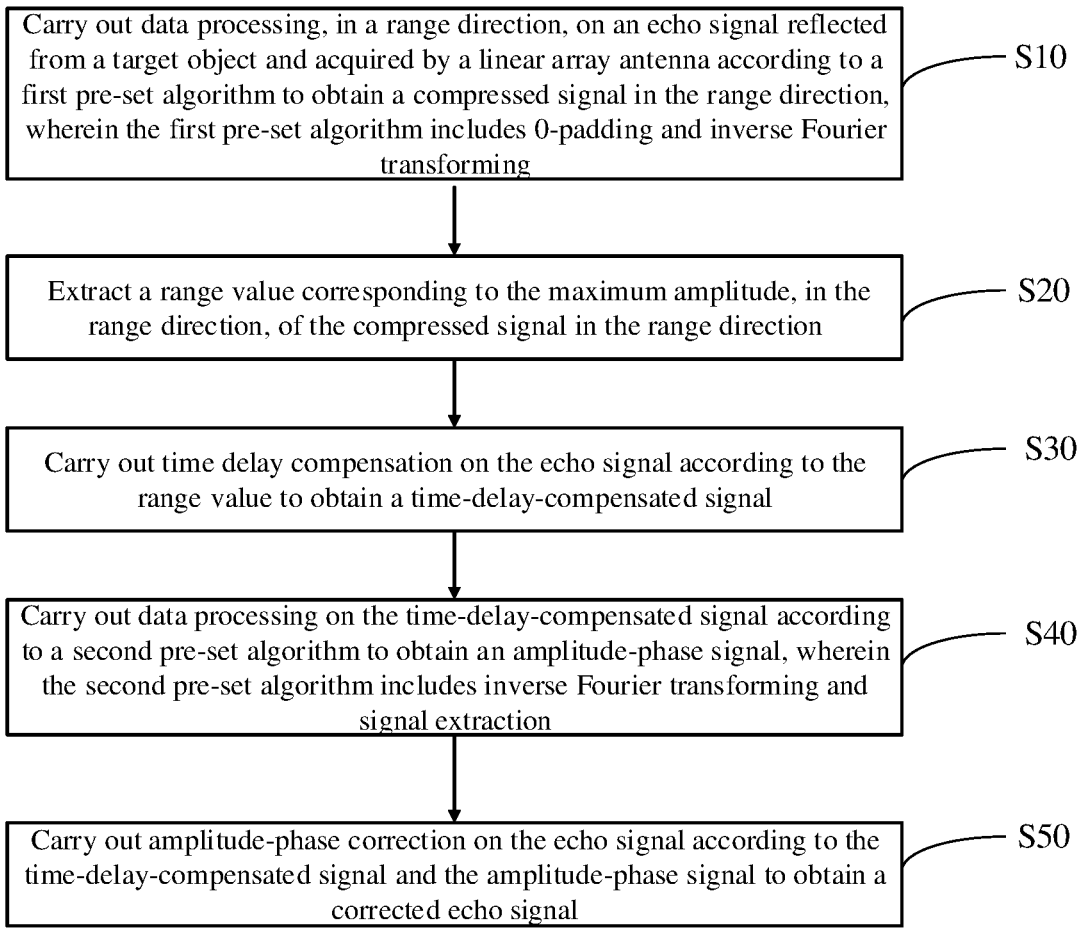
FIG. 2 is a basic flow block diagram of an amplitude-phase correction method for a microwave imaging system in one embodiment of the disclosure.

As shown in FIG. 2, one embodiment of the disclosure provides an amplitude-phase correction method for a microwave imaging system. The amplitude-phase correction method comprises:

S10: data processing in a range direction is carried out on an echo signal reflected from a target object and acquired by a linear array antenna according to a first pre-set algorithm to obtain a compressed signal in the range direction.

In specific applications, the carrying out data processing in the range direction on the echo signal reflected from the target object and acquired by the linear array antenna, specifically refers to data processing in the range direction is carried out on echo signals, acquired by all antennas in the linear antenna array, from the target object by means of the first pre-set algorithm, to obtain compressed signals in the range direction of echo data acquired by all the antennas.

In one embodiment, the amplitude-phase correction method further comprises the following steps which should be performed before S10:

The linear array antenna is controlled to rotate around a pre-set rotation axis to obtain the echo signal of the target object, wherein the distance from the linear array antenna to the target object is controlled within a pre-set range.

In specific applications, when the linear array antenna is the vertical linear array antenna shown in FIG. 1, the pre-set rotation axis is the Z axis in FIG. 1, the target object can be a metal plate which has high microwave reflectivity and the pre-set range band can be set according to actual requirements. In one embodiment, the pre-set range band can be 3 cm (centimeter)-15 cm, and the range from the target object to the array antenna is the vertical range $r_0$ from the geometric central point of the target object to the plane where the array antenna is located.

In one embodiment, the expression of the echo signals acquired at the phase centers, in the array direction, of all the antennas in the linear array antenna is as follows:

$$S_1(k,z) \qquad (1)$$

Wherein, $k=4\pi f/C$, k is the two-way wave number in the range direction, f is the signal transmitting frequency, C is the speed of light, k direction is the range direction (namely the direction of a line between the phase center, in the array direction, of each antenna and a corresponding signal reflection point on the target object), z is the position of each phase center in the array direction, z direction is the array direction, and z in expression (1) of the echo signals corresponding to different antennas has different values.

In one embodiment, the first pre-set algorithm particularly includes zero-padding and inverse Fourier transforming, and the expression of the compressed signal in the range direction is as follows:

$$S_2(r, z) = \frac{1}{2\pi} \int_k S_1(k, z) \exp(jkr) dk \qquad (2)$$

Wherein, r is the range from the phase center, in the array direction, of each antenna to the corresponding signal reflection point on the target object, and r in expression (2) of the compressed signal in the range direction, corresponding to different antennas, has different values.

S20: a range value corresponding to the maximum amplitude, in the range direction, of the compressed signal in the range direction is extracted.

In one embodiment, the expression of the range value is as follows:

$$d(z) \qquad (3)$$

Wherein, z in expression (3) of the range value corresponding to different antennas has different values.

S30: time delay compensation is carried out on the echo signal according to the range value to obtain a time-delay-compensated signal In one embodiment, S30 comprises:

Time delay compensation is carried out on the echo signal $S_1(k,z)$ according to the time-delay compensation function $H(k,Z)=\exp[jkd(z)]$ to obtain the time-delay-compensated signal $S_3(k,z)$.

S40: data processing is carried out on the time-delay-compensated signal according to a second pre-set algorithm to obtain an amplitude-phase signal.

In one embodiment, the second pre-set algorithm particularly includes inverse Fourier transforming and signal extraction.

S50: amplitude-phase correction is carried out on the echo signal according to the time-delay-compensated signal and the amplitude-phase signal to obtain a corrected echo signal.

In one embodiment, S50 particularly comprises:

The corrected echo signal is obtained by calculation according to the formula $E_c(\theta,k, z)$ $(\theta,k,z) \cdot \exp\{jk \cdot (d(z)-r_0)\} \cdot s^*(z)/|s(z)|^2$;

Wherein, $E_c(\theta,k,z)$ is the corrected echo signal, $E(\theta,k,z)$ is the echo signal, $\exp\{jk \cdot (d(z)-r_0)\}$ is the time-delay-compensated signal, $s(z)$ is the amplitude-phase signal, and * represents conjugation.

By means of directly carrying out amplitude-phase correction on the echo signal, acquired by the linear array antenna, from the target object, the method in this embodiment does not depend on direct waves, and the difference between directional patterns of channels of the linear array antenna can be better compensated for.

Figure 3:
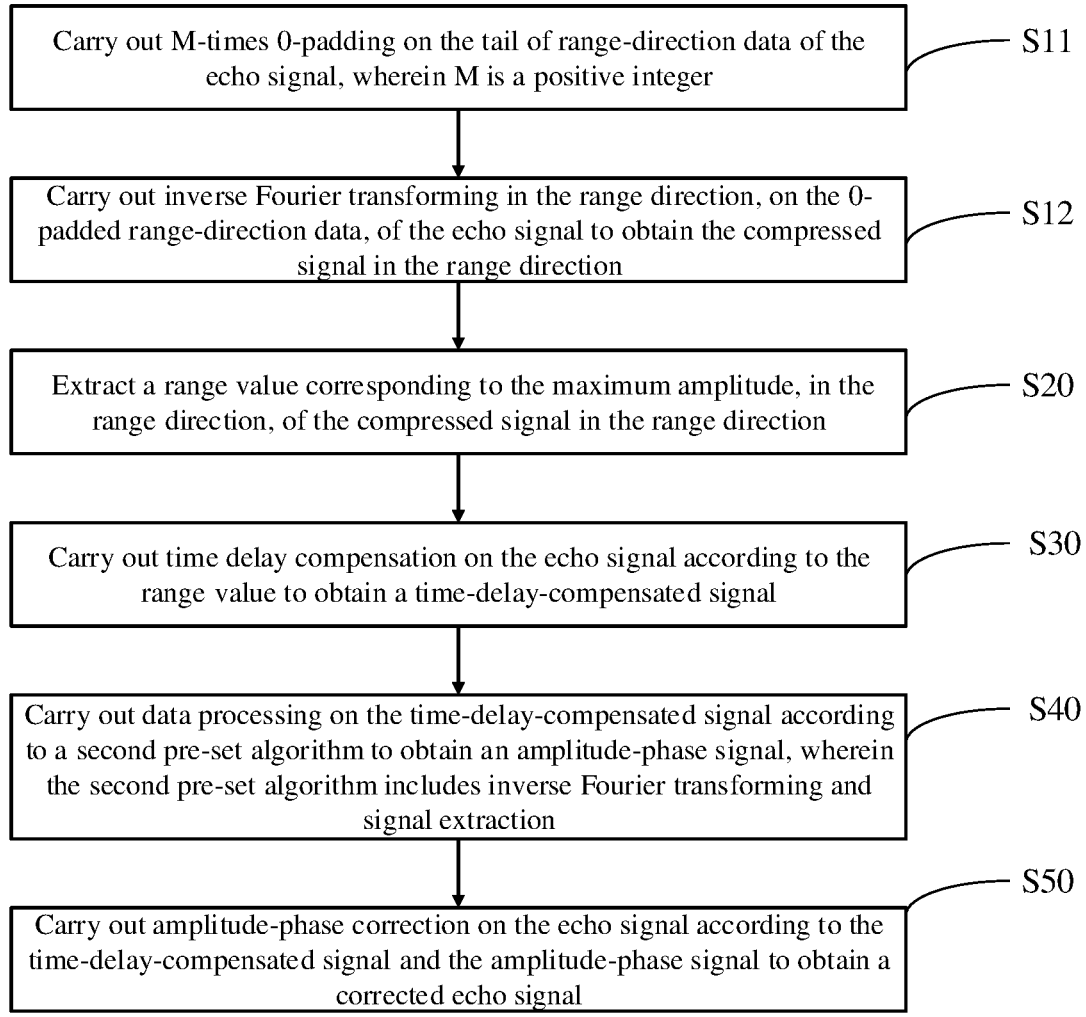
FIG. 3 is a specific flow block diagram of the amplitude-phase correction method for a microwave imaging system in one embodiment of the disclosure.

As shown in FIG. 3, in one embodiment of the disclosure, S10 in the embodiment shown in FIG. 2 particularly comprises:

S11: M-times 0-padding is carried out on the tail of range-direction data of the echo signal, wherein M is a positive integer.

In specific applications, M can be set as actually needed and can be an integer from 10 to 1000, such as 20, 50, 100. In this embodiment, the default value of M is 20.

S12: inverse Fourier transforming in the range direction is carried out on the 0-padded range-direction data, of the echo signal to obtain the compressed signal in the range direction.

In specific applications, the inverse Fourier transforming can be parallel inverse fast Fourier transform, i.e. the inverse Fourier transforming in the range direction can be carried out on the 0-padded range-direction data, of the echo signals corresponding to all the antennas at the same time, and thus, the data processing speed is increased.

Figure 4:
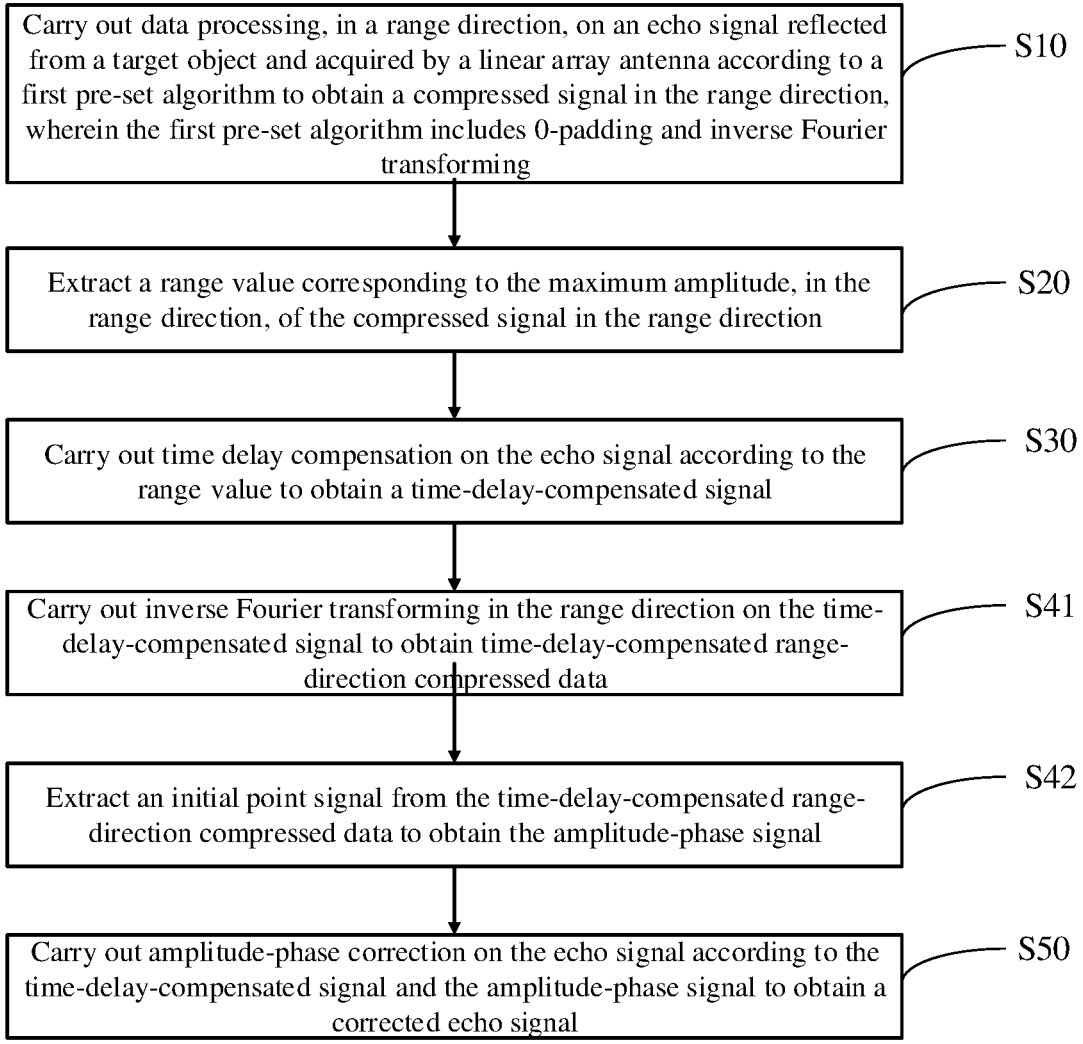
FIG. 4 is a specific flow block diagram of the amplitude-phase correction method for a microwave imaging system in another embodiment of the disclosure.

As shown in FIG. 4, in one embodiment of the disclosure, S40 in the embodiment shown in FIG. 2 particularly comprises:

S41: inverse Fourier transforming in the range direction is carried out on the time-delay-compensated signal to obtain time-delay-compensated range-direction compressed data.

In specific applications, the inverse Fourier transforming can be parallel inverse fast Fourier transform, i.e. the inverse Fourier transforming in the range direction can be carried out on the time-delay-compensated signals corresponding to all the antennas at the same time, and thus, the data processing speed is increased.

In one embodiment, the expression of the time-delay-compensated range-direction compressed data is as follows:

$$S_4(r, z) = \frac{1}{2\pi} \int_k S_3(k, z) \exp(jkr) dk \qquad (4)$$

S42: an initial point signal is extracted from the time-delay-compensated range-direction compressed data to obtain the amplitude-phase signal.

In specific applications, the initial point signal is a signal at a position meeting r=0.

In one embodiment, the expression of the amplitude-phase signal is as follows:

$$s(z)=S_5(\theta,z) \qquad (5)$$

In one embodiment, the microwave imaging system is a cylindrical scanning system, the expression of the echo signal reflected from the object signal and acquired by the cylindrical scanning system is $E(\theta,k,z)$, and correspondingly, the expression of the corrected echo signal obtained in the corresponding step of the method in the embodiment shown in FIGS. 2-4 is as follows:

$$E_c(\theta,k,z)=E(\theta,k,z) \cdot \exp\{jk \cdot (d(z)-r_0)\} \cdot s^*(z)/|s(z)|^2 \qquad (6)$$

Wherein, θ is the rotation angle of the linear array antenna rotating around the pre-set rotation axis, • refers to multiplication, and * refers to conjugation.

In this embodiment of the disclosure, amplitude-phase error correction is carried out on the echo signal reflected from the target object and acquired by the linear array antenna rotating around the pre-set rotation axis by means of inverse Fourier transforming, multiplication by a reference function, and other algorithms and steps, so that the method is easy to operate and implement, and high in precision, does not depend on direct waves, and can be widely used for amplitude-phase correction of various microwave imaging systems, particularly close-range microwave imaging systems.

Figure 5:
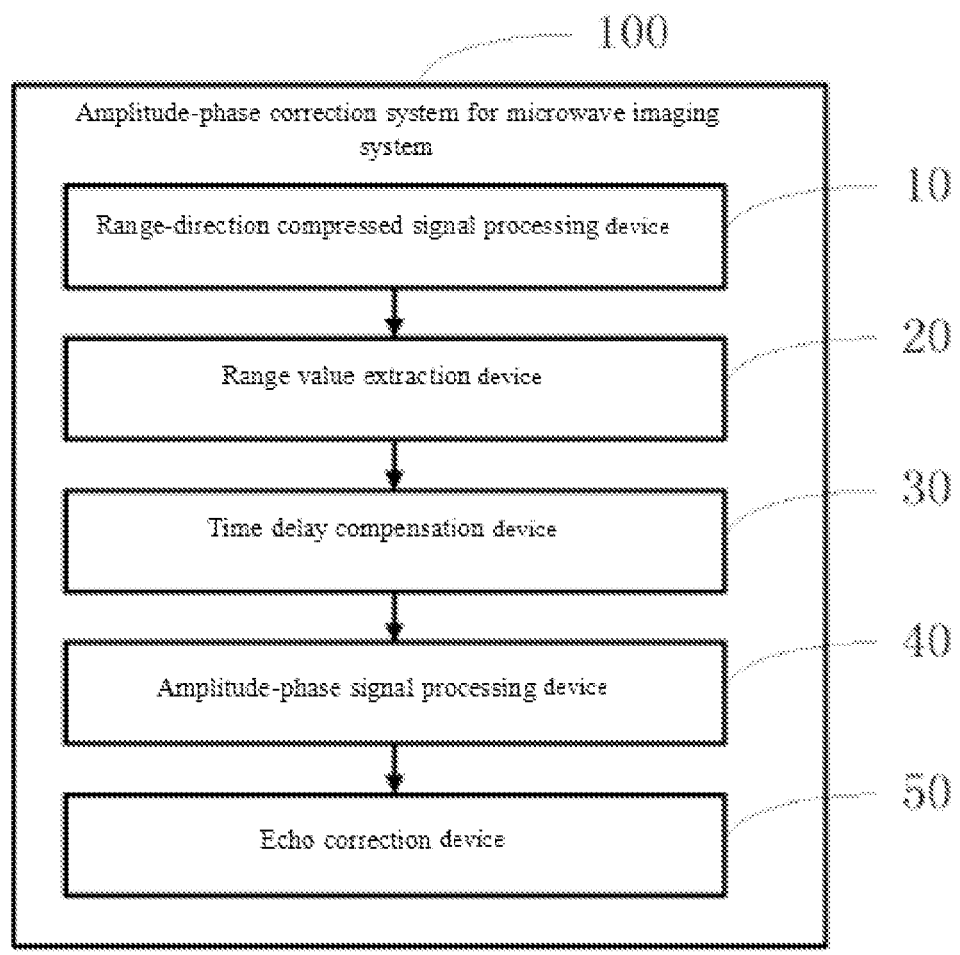
FIG. 5 is a basic structural block diagram of an amplitude-phase correction system for a microwave imaging system in one embodiment of the disclosure.

As shown in FIG. 5, one embodiment of the disclosure provides an amplitude-phase correction system for a microwave imaging system 100. The amplitude-phase correction system is used to perform the corresponding steps of the method in the embodiment shown in FIG. 2 and comprises:

A range-direction compressed signal processing device 10, configured to carry out data processing, in a range direction, on an echo signal reflected from a target object and acquired by a linear array antenna according to a first pre-set algorithm to obtain a compressed signal in the range direction;

A range value extraction device 20, configured to extract a range value corresponding to the maximum amplitude, in the range direction, of the compressed signal in the range direction;

A time delay compensation device 30, configured to carry out time delay compensation on the echo signal according to the range value to obtain a time-delay-compensated signal;

An amplitude-phase signal processing device 40, configured to carry out data processing on the time-delay-compensated signal according to a second pre-set algorithm to obtain an amplitude-phase signal; and An echo correction device 50, configured to carry out amplitude-phase corrections on the echo signal according to the time-delay-compensated signal and the amplitude-phase signal to obtain a corrected echo signal.

In one embodiment, the amplitude-phase correction system 100 further comprises:

An echo signal acquisition device, configured to control a linear array antenna to rotate around a pre-set rotation axis to obtain the echo signal reflected from the target object, wherein the distance from the linear array antenna to the target object is within a pre-set range.

In one embodiment, the time delay compensation device 50 is particularly configured to:

Obtaining the corrected echo signal by calculation according to the formula $E_c(\theta,k,z)=E(\theta, k,z)\cdot\exp\{jk\cdot(d(z)-r_0)\}\cdot s^*(z)/|s(z)|^2$;

Wherein, $E_c(\theta,k,z)$ is the corrected echo signal, $E(\theta,k,z)$ is the echo signal, $\exp\{jk\cdot(d(z)-r_0)\}$ is the time-delay-compensated signal, $s(z)$ is the amplitude-phase signal, and * represents conjugation.

In this embodiment, by means of directly carrying out amplitude-phase correction on the echo signal, acquired by the linear array antenna, from the target object, the system does not depend on direct waves, and the difference between directional patterns of channels of the linear array antenna can be better compensated for.

Figure 6:
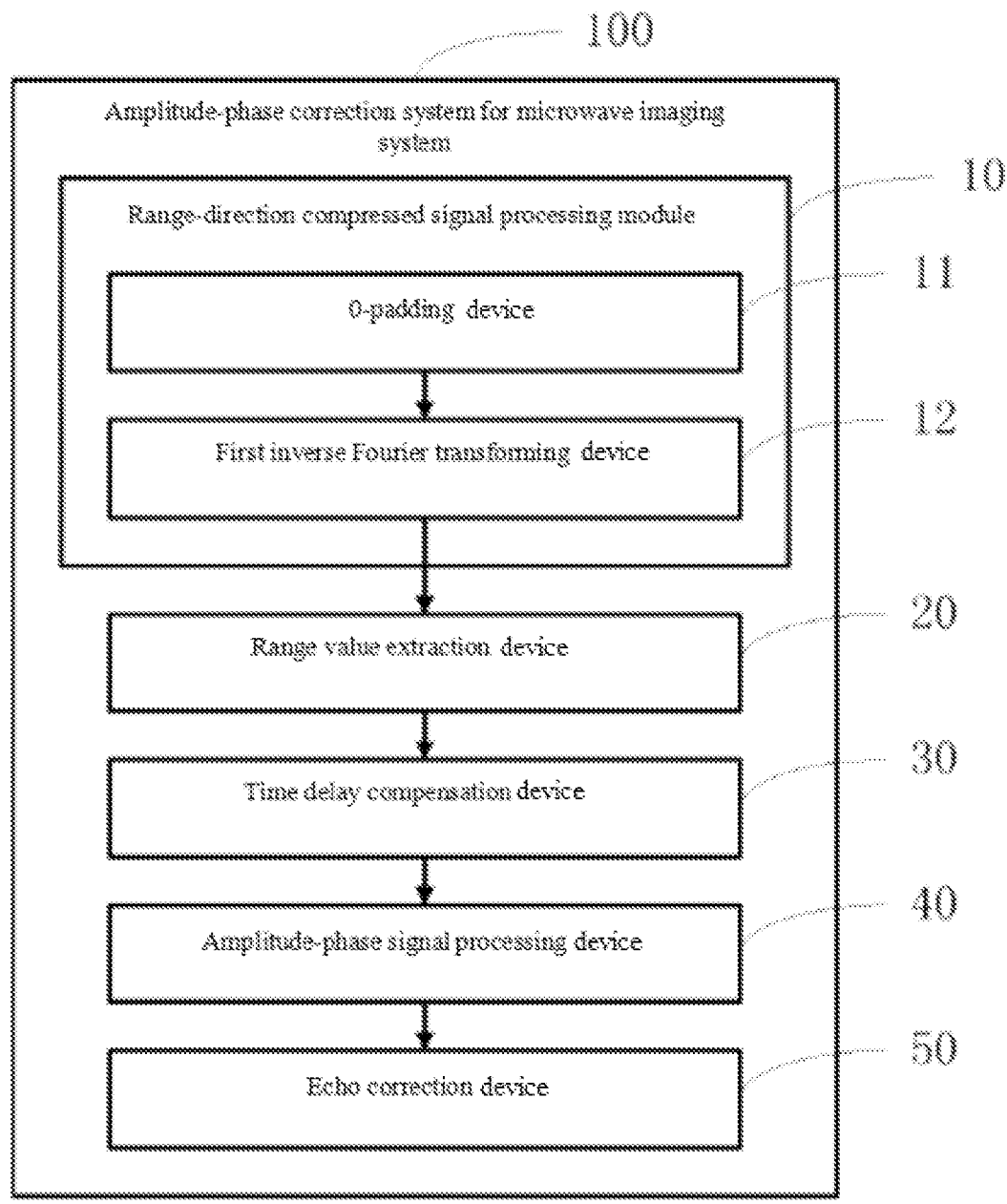
FIG. 6 is a specific block diagram of the amplitude-phase correction system for a microwave imaging system in one embodiment of the disclosure.

As shown in FIG. 6, in one embodiment of the disclosure, the range-direction compressed signal processing device 10 in the embodiment shown in FIG. 5 comprises structure used to perform the steps of the method in the embodiment shown in FIG. 3, which comprises:

A 0-padding device 11, configured to carry out M-times 0-padding on the tail of range-direction data of the echo signal, wherein M is a positive integer; and A first inverse Fourier transforming device 12, configured to carry out inverse Fourier transforming in the range direction on the 0-padded range-direction data, of the echo signal to obtain the compressed signal in the range direction.

Figure 7:
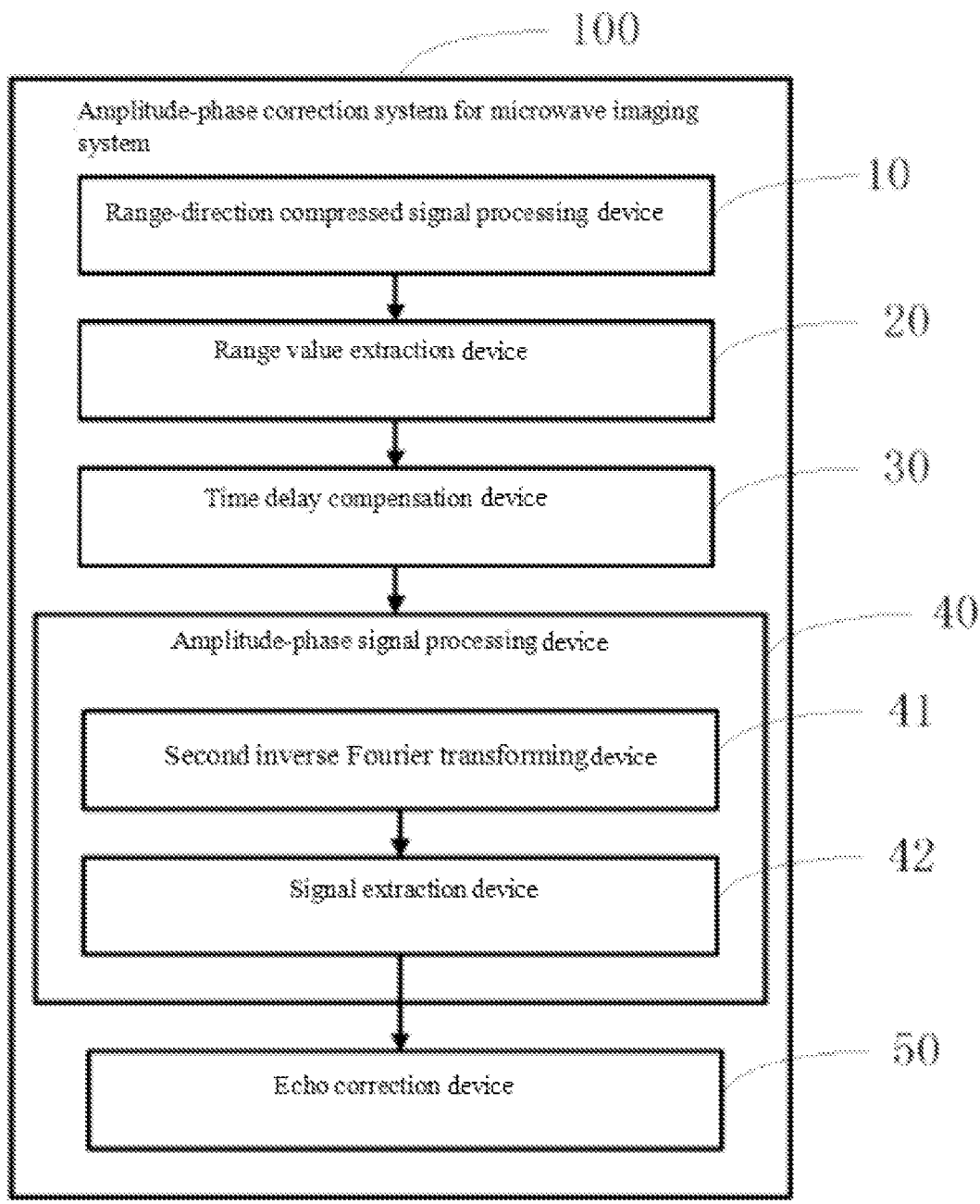
FIG. 7 is a specific structural diagram of the amplitude-phase correction system for a microwave imaging system in another embodiment of the disclosure.

As shown in FIG. 7, in one embodiment of the disclosure, the amplitude-phase signal processing device 40 in the embodiment shown in FIG. 5 comprises structure used to perform the steps of the method in the embodiment shown in FIG. 3, which comprises:

A second inverse Fourier transforming device 41, configured to carry out inverse Fourier transforming in the range direction, on the time-delay-compensated signal to obtain time-delay-compensated range-direction compressed data: and A signal extraction device 42, configured to extract an initial point signal from the time-delay-compensated range-direction compressed data to obtain the amplitude-phase signal.

In one embodiment, the microwave imaging system is a cylindrical scanning system, and the time delay compensation device 50 is particularly configured to:

Obtain a corrected echo signal of the cylindrical scanning system by calculation according to the formula $E_c(\theta,k,z)=E(\theta,k,z)\cdot\exp\{jk\cdot(d(z)-r_0)\}\cdot s^*(z)/|s(z)|^2$;

Wherein, $\theta$ is the rotation angle of the linear array antenna rotating around the pre-set rotation axis, • refers to multiplication, and * refers to conjugation.

In this embodiment of the disclosure, amplitude-phase error correction is carried out on the echo signal reflected from the target object and acquired by the linear array antenna rotating around the pre-set rotation axis by means of inverse Fourier transforming, multiplication by a reference function, and other algorithms and steps, so that the disclosure is easy to operate and implement, and high in precision, does not depend on direct waves, and can be widely used for amplitude-phase correction of various microwave imaging systems, particularly close-range microwave imaging systems.

The steps of the method in all the embodiments of the disclosure can be re-ordered, combined, or omitted according to actual requirements.

The devices of the device in all the embodiments of the disclosure can be combined, partitioned, or omitted according to actual requirements.

The above embodiments are only preferred ones of the disclosure, and are not intended to limit the disclosure. Any modifications, equivalent substitutes and improvements achieved based on the spirit and principle of the disclosure should also fall within the protection scope of the disclosure.

What is claimed is:

1. An amplitude-phase correction method for a microwave imaging system, comprising:

carrying out data processing, in a range direction, on an echo signal reflected from a target object and acquired by a linear array antenna according to a first pre-set algorithm to obtain a compressed signal in the range direction, wherein the first pre-set algorithm includes 0-padding and inverse Fourier transforming;

extracting a range value corresponding to a maximum amplitude, in the range direction, of the compressed signal in the range direction;

carrying out time delay compensation on the echo signal according to the range value to obtain a time-delay-compensated signal;

carrying out data processing on the time-delay-compensated signal according to a second pre-set algorithm to obtain an amplitude-phase signal, wherein the second pre-set algorithm includes inverse Fourier transforming and signal extraction; and carrying out amplitude-phase correction on the echo signal according to the time-delay-compensated signal and the amplitude-phase signal to obtain a corrected echo signal.

2. The amplitude-phase correction method according to claim 1, wherein the carrying out data processing, in a range direction, on an echo signal reflected from a target object and acquired by a linear array antenna according to the first pre-set algorithm to obtain a compressed signal in the range direction comprises:

carrying out M-times 0-padding on a tail of range-direction data of the echo signal, wherein M is a positive integer; and carrying out inverse Fourier transforming in the range direction, on the 0-padded range-direction data of the echo signal to obtain the compressed signal in the range direction.

3. The amplitude-phase correction method according to claim 1, the carrying out data processing on the time-delay-compensated signal according to the second pre-set algorithm to obtain an amplitude-phase signal comprises:

carrying out inverse Fourier transforming in the range direction, on the time-delay-compensated signal to obtain time-delay-compensated range-direction compressed data; and extracting an initial point signal from the time-delay-compensated range-direction compressed data to obtain the amplitude-phase signal.

4. The amplitude-phase correction method according to claim 1, wherein the carrying out amplitude-phase correction on the echo signal according to the time-delay-compensated signal and the amplitude-phase signal to obtain a corrected echo signal comprises:

obtaining the corrected echo signal by calculation according to a formula $E_c(\theta,k,z)=E(\theta,k,z)\cdot\exp\{jk\cdot(d(z)-r_0)\}\cdot s^*(z)/|s(z)|^2$;

wherein $E_c(\theta,k,z)$ is the corrected echo signal, $E(\theta,k,z)$ is the echo signal, $\exp\{jk\bullet(d(z)-r_0)\}$ is the time-delay-compensated signal, $s(z)$ is the amplitude-phase signal, and * represents conjugation.

5. The amplitude-phase correction method according to claim 1, wherein the amplitude-phase correction method further comprises:

before the carrying out data processing, in a range direction, on an echo signal reflected from a target object and acquired by a linear array antenna according to the first pre-set algorithm to obtain a compressed signal in the range direction:

controlling the linear array antenna to rotate around a pre-set rotation axis to obtain the echo signal reflected from the target object, wherein a distance from the linear array antenna to the target object is within a pre-set range.

6. An amplitude-phase correction system for a microwave imaging system, comprising:

a range-direction compressed signal processing device, configured to carry out data processing, in a range direction, on an echo signal reflected from a target object and acquired by a linear array antenna according to a first pre-set algorithm to obtain a compressed signal in the range direction, wherein the first pre-set algorithm includes 0-padding and inverse Fourier transforming;

a range value extraction device, configured to extract a range value corresponding to a maximum amplitude, in the range direction, of the compressed signal in the range direction;

a time delay compensation device configured to carry out time delay compensation on the echo signal according to the range value to obtain a time-delay-compensated signal;

an amplitude-phase signal processing configured to carry out data processing on the time-delay-compensated signal according to a second pre-set algorithm to obtain an amplitude-phase signal, wherein the second pre-set algorithm includes inverse Fourier transforming and signal extraction; and an echo correction device configured to carry out amplitude-phase correction on the echo signal according to the time-delay-compensated signal and the amplitude-phase signal to obtain a corrected echo signal.

7. The amplitude-phase correction system according to claim 6, wherein the range-direction compressed signal processing module comprises:

a 0-padding device configured to carry out M-times 0-padding on a tail of range-direction data of the echo signal, wherein M is a positive integer; and a first inverse Fourier transforming device configured to carry out inverse Fourier transforming in the range direction, on the 0-padded range-direction data of the echo signal to obtain the compressed signal in the range direction.

8. The amplitude-phase correction system according to claim 6, wherein the amplitude-phase signal processing device comprises:

a second inverse Fourier transforming configured to carry out inverse Fourier transforming in the range direction, on the time-delay-compensated signal to obtain time-delay-compensated range-direction compressed data; and a signal extraction configured to extract an initial point signal from the time-delay-compensated range-direction compressed data to obtain the amplitude-phase signal.

9. The amplitude-phase correction system according to claim 6, wherein the time delay compensation device is configured to:

obtain the corrected echo signal by calculation according to a formula $E_c(\theta, k, z)=E(\theta,k, z)\cdot\exp\{jk\cdot(d(z)-r_0)\}\cdot s^*(z)/|s(z)|^2$;

wherein, $E_c(\theta,k,z)$ is the corrected echo signal, $E(\theta,k,z)$ is the echo signal, $\exp\{jk\cdot(d(z)-r_0)\}$ is the time-delay-compensated signal, $s(z)$ is the amplitude-phase signal, and * represents conjugation.

10. The amplitude-phase correction system according to claim 6, wherein the amplitude-phase correction system further comprises:

an echo signal acquisition configured to control the linear array antenna to rotate around a pre-set rotation axis to obtain the echo signal reflected from the target object, wherein a distance from the linear array antenna and the target object is within a pre-set range.

* * * * *